(12) United States Patent
Kuramoto et al.

(10) Patent No.: US 10,125,245 B2
(45) Date of Patent: Nov. 13, 2018

(54) RUBBER COMPOSITION FOR TIRE

(71) Applicant: ZEON CORPORATION, Tokyo (JP)

(72) Inventors: Naoaki Kuramoto, Tokyo (JP);
Takeshi Sugimura, Tokyo (JP); Shingo Okuno, Tokyo (JP); Hiroyuki Nitadori, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/519,695

(22) PCT Filed: Oct. 16, 2015

(86) PCT No.: PCT/JP2015/079366
§ 371 (c)(1),
(2) Date: Apr. 17, 2017

(87) PCT Pub. No.: WO2016/060262
PCT Pub. Date: Apr. 21, 2016

(65) Prior Publication Data
US 2017/0233560 A1 Aug. 17, 2017

(30) Foreign Application Priority Data
Oct. 17, 2014 (JP) .................................. 2014-212361

(51) Int. Cl.
| | | |
|---|---|---|
| *C08L 9/06* | (2006.01) | |
| *B60C 1/00* | (2006.01) | |
| *C08K 3/36* | (2006.01) | |
| *C08K 5/54* | (2006.01) | |
| *C08L 15/00* | (2006.01) | |
| *C08C 19/25* | (2006.01) | |
| *C08C 19/44* | (2006.01) | |
| *C08G 61/08* | (2006.01) | |
| *C08L 65/00* | (2006.01) | |

(52) U.S. Cl.
CPC .................. *C08L 9/06* (2013.01); *B60C 1/00* (2013.01); *C08C 19/25* (2013.01); *C08C 19/44* (2013.01); *C08G 61/08* (2013.01); *C08K 3/36* (2013.01); *C08K 5/54* (2013.01); *C08L 15/00* (2013.01); *C08G 2261/418* (2013.01); *C08G 2261/60* (2013.01); *C08G 2261/726* (2013.01); *C08L 65/00* (2013.01)

(58) Field of Classification Search
CPC ................................... C08L 9/06; C08L 65/00

USPC .......................................................... 524/521
See application file for complete search history.

(56) References Cited

U.S. PATENT DOCUMENTS

| | | | |
|---|---|---|---|
| 2006/0155076 A1 | 7/2006 | Nakamura et al. | |
| 2012/0296035 A1* | 11/2012 | Tsunogae | B60C 1/00 524/576 |
| 2013/0267646 A1* | 10/2013 | Kameda | C08L 9/06 524/526 |
| 2013/0281615 A1 | 10/2013 | Tsunogae et al. | |
| 2014/0011909 A1 | 1/2014 | Satou et al. | |

FOREIGN PATENT DOCUMENTS

| | | |
|---|---|---|
| CN | 103237841 A | 8/2013 |
| JP | 2004-231905 A | 8/2004 |
| JP | 2005-325206 A | 11/2005 |
| JP | 2010-037362 A | 2/2010 |
| JP | 5429255 B2 | 2/2014 |
| WO | 2003/102053 A1 | 12/2003 |
| WO | 2011/087072 A1 | 7/2011 |
| WO | 2012/043802 A1 | 4/2012 |

OTHER PUBLICATIONS

Apr. 18, 2017 International Preliminary Report on Patentability issued with International Patent Application No. PCT/JP2015/079366.
Dec. 22, 2015 International Search Report issued in International Patent Application No. PCT/JP2015/079366.

* cited by examiner

*Primary Examiner* — Hui H Chin
(74) *Attorney, Agent, or Firm* — Oliff PLC

(57) ABSTRACT

Provided is a rubber composition for a tire containing a rubber component including 15 to 55 wt % of an end modified group-containing cycloolefin ring-opening polymer having a glass transition temperature of −120 to −90° C. and 45 to 85 wt % of an end modified group-containing solution polymerized conjugated diene polymer having a glass transition temperature of −60 to −10° C. and having an aromatic vinyl monomer unit content ratio of more than 30 wt % and 50 wt % or less, a silica, and a silane coupling agent including a monosulfide group and/or a thiol group, wherein the content of the silica with respect to 100 parts by weight of the rubber component is 30 to 200 parts by weight, and the content of the silane coupling agent including a monosulfide group and/or a thiol group with respect to 100 parts by weight of the silica is 0.3 to 20 parts by weight.

9 Claims, No Drawings

RUBBER COMPOSITION FOR TIRE

TECHNICAL FIELD

The present invention relates to a rubber composition for a tire, more particularly relates to a rubber composition for a tire which can give a cross-linked rubber excellent in abrasion resistance (in particular, abrasion resistance in a region where a slip ratio is low) and low heat buildup property.

BACKGROUND ART

Butadiene rubber or styrene-butadiene rubber is widely used as synthetic rubber for use as a material of a tire. While butadiene serving as a raw material of butadiene rubber or styrene-butadiene rubber is produced as a by-product in production of ethylene by cracking of naphtha, as a method for producing ethylene, a method where a natural gas such as ethane is used as a raw material has been recently extended and therefore a reduction in production volume of butadiene has been predicted. Therefore, there have been advanced various studies about use of synthetic rubber which is obtained without using butadiene as a raw material, as an alternative material of butadiene rubber or styrene-butadiene rubber.

As one synthetic rubber studied as the alternative material of butadiene rubber or styrene-butadiene rubber, a cyclopentene ring-opening polymer which is obtained by ring-opening polymerization of cyclopentene may be mentioned. For example, Patent Document 1 proposes a technique where cyclopentene is subjected to ring-opening polymerization in the presence of a compound having a functional group and an ethylenically unsaturated bond, thereby introducing the functional group to an end of a cyclopentene ring-opening polymer so as to improve affinity between the cyclopentene ring-opening polymer and an inorganic particle. Further, Patent Document 2 proposes a technique where an alkoxysilyl group is bonded to an end of a polymer chain via a urethane bound group to thereby improve affinity between a cyclopentene ring-opening polymer and an inorganic particle.

However, if considering the rising demands for safety from tires in recent years, for example, in a rubber composition using the cyclopentene ring-opening polymer specifically described in Patent Document 1 and Patent Document 2, the obtained cross-linked rubber have been sometimes insufficient in abrasion resistance and low heat buildup property. Therefore, the rubber composition containing the cyclopentene ring-opening polymer has been demanded to be improved for giving a cross-linked rubber excellent in abrasion resistance and low heat buildup property.

Aside from the above, Patent Document 3 proposes, as a rubber composition aimed to be improved in abrasion resistance and low heat buildup property, a rubber composition for a tire tread which contains a diene rubber including 30 wt % or more of an end modified group-containing conjugated diene copolymer which is end-modified, silica, carbon black and a specified silane coupling agent.

RELATED ART

Patent Documents

Patent Document 1: Japanese Patent Publication No. 2010-37362
Patent Document 2: International Publication No. WO2012/043802
Patent Document 3: Japanese Patent No. 5429255

SUMMARY OF THE INVENTION

Problem to be Solved by the Invention

The technique in Patent Document 3, however, aims at preventing abrasion under a high slip ratio condition (specifically, condition of a slip ratio of 25%), specifically, abrasion during starting and braking, and is not sufficient in the suppression effect of abrasion in a region where a slip ratio is low (specifically, abrasion during normal running). In particular, abrasion occurring in a region where a slip ratio is low, that is, a region where a level of friction energy is low, is known to well correlate to abrasion in an actual vehicle, and therefore it is important from the viewpoint of prevention of abrasion in an actual vehicle to suppress abrasion in a region where a slip ratio is low.

The present invention has been made in view of such circumstances, and an object thereof is to provide a rubber composition for a tire which can give a cross-linked rubber excellent in abrasion resistance (in particular, abrasion resistance in a region where a slip ratio is low) and low heat buildup property.

Means for Solving the Problem

The inventors engaged in intensive research to achieve the above object and as a result discovered that, by cross-linking a rubber composition which is obtained by using an end modified group-containing cycloolefin ring-opening polymer having a glass transition temperature of −120 to −90° C. and an end modified group-containing solution polymerized conjugated diene polymer obtained by solution polymerization, having a glass transition temperature of −60 to −10° C. and having an aromatic vinyl monomer unit content ratio of more than 30 wt % and 50 wt % or less in a predetermined ratio in combination, and by compounding predetermined amounts of a silica and a silane coupling agent including a monosulfide group and/or a thiol group to such a combination, a cross-linked rubber excellent in abrasion resistance and low heat buildup property can be obtained. The present invention was completed based on this discovery.

That is, according to the present invention, there is provided a rubber composition for a tire, comprising: a rubber component including 15 to 55 wt % of an end modified group-containing cycloolefin ring-opening polymer having a glass transition temperature of −120 to −90° C. and 45 to 85 wt % of an end modified group-containing solution polymerized conjugated diene polymer having a glass transition temperature of −60 to −10° C. and having an aromatic vinyl monomer units content ratio of more than 30 wt % and 50 wt % or less, a silica, and a silane coupling agent including a monosulfide group and/or a thiol group, wherein a content of the silica with respect to 100 parts by weight of the rubber component is 30 to 200 parts by weight, and a content of the silane coupling agent including a monosulfide group and/or a thiol group with respect to 100 parts by weight of the silica is 0.3 to 20 parts by weight.

In the above rubber composition for a tire, the end modified group-containing cycloolefin ring-opening polymer is preferably a polymer in which an oxysilyl group is introduced to an end of a polymer chain.

In the above rubber composition for a tire, the end modified group-containing solution polymerized conjugated diene polymer preferably has a group introduced by a reaction of at least one of the compounds represented by the following general formulas (1) to (3) with a solution polymerized conjugated diene polymer chain having an active end:

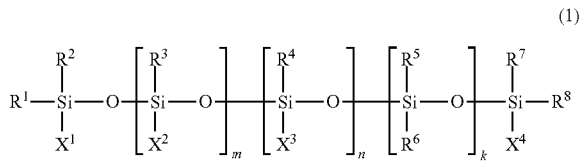

(1)

where, in the above general formula (1), each of $R^1$ to $R^8$ represents an alkyl group having 1 to 6 carbon atoms or an aryl group having 6 to 12 carbon atoms, and $R^1$ to $R^8$ may be the same as or different from each other; each of $X^1$ and $X^4$ represents a functional group able to react with the active end of the polymer chain, an alkyl group having 1 to 6 carbon atoms, or an aryl group having 6 to 12 carbon atoms, and $X^1$ and $X^4$ may be the same as or different from each other; $X^2$ represents a functional group able to react with the active end of the polymer chain; $X^3$ represents a group containing 2 to 20 alkyleneglycol repeating units; and "m" is an integer of 3 to 200, "n" is an integer of 0 to 200, and "k" is an integer of 0 to 200;

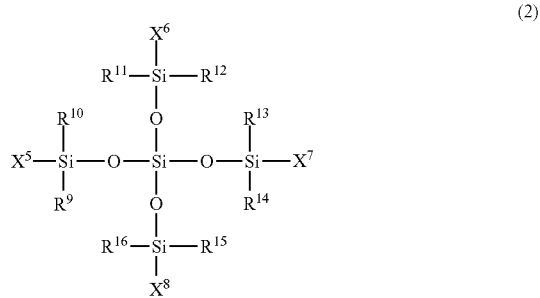

(2)

where, in the above general formula (2), each of $R^9$ to $R^{16}$ represents an alkyl group having 1 to 6 carbon atoms or an aryl group having 6 to 12 carbon atoms, and $R^9$ to $R^{16}$ may be the same as or different from each other; and each of $X^5$ to $X^8$ represents a functional group able to react with the active end of the polymer chain;

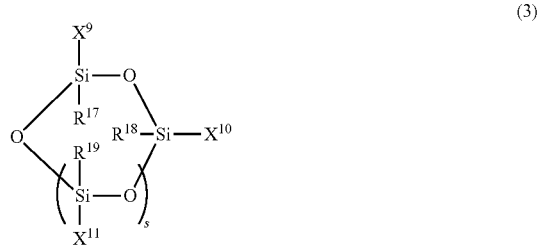

(3)

where, in the above general formula (3), each of $R^{17}$ to $R^{19}$ represents an alkyl group having 1 to 6 carbon atoms or an aryl group having 6 to 12 carbon atoms, and $R^{17}$ to $R^{19}$ may be the same as or different from each other; each of $X^9$ to $X^{11}$ represents a functional group able to react with the active end of the polymer chain; and "s" is an integer of 1 to 18.

In the above rubber composition for a tire, the end modified group-containing solution polymerized conjugated diene polymer preferably contains 1,3-butadiene units and isoprene units as conjugated diene monomer units.

In the above rubber composition for a tire, a nitrogen adsorption specific surface area of the silica is preferably 50 to 300 m$^2$/g.

The above rubber composition for a tire preferably further comprises 1 to 150 parts by weight of carbon black with respect to 100 parts by weight of the rubber component.

Further, according to the present invention, there are provided a cross-linked rubber obtained by cross-linking the above-described rubber composition for a tire, and a tire comprising this cross-linked rubber.

Effects of Invention

According to the present invention, there is provided a rubber composition for a tire which can give a cross-linked rubber excellent in abrasion resistance (in particular, abrasion resistance in a region where a slip ratio is low) and low heat buildup property.

DESCRIPTION OF EMBODIMENTS

The rubber composition for a tire of the present invention is a rubber composition containing a rubber component including 15 to 55 wt % of an end modified group-containing cycloolefin ring-opening polymer having a glass transition temperature of −120 to −90° C. and 45 to 85 wt % of an end modified group-containing solution polymerized conjugated diene polymer obtained by solution polymerization, having a glass transition temperature of −60 to −10° C. and having an aromatic vinyl monomer units content ratio of more than 30 wt % and 50 wt % or less, silica, and a silane coupling agent including a monosulfide group and/or a thiol group, wherein the content of the silica with respect to 100 parts by weight of the rubber component is 30 to 200 parts by weight, and the content of the silane coupling agent including a monosulfide group and/or a thiol group with respect to 100 parts by weight of the silica is 0.3 to 20 parts by weight.

In the rubber composition for a tire of the present invention, the end modified group-containing cycloolefin ring-opening polymer contained as an essential component is a polymer containing repeating units obtained by ring-opening polymerization of cycloolefin, as the repeating units foaming the main chain, containing a modified group at a polymer chain end, and having a glass transition temperature of −120 to −90° C.

The cycloolefin for foaming the end modified group-containing cycloolefin ring-opening polymer used in the present invention is not particularly limited, and for example, monocycloolefin, monocyclodiene, monocyclotriene, polycyclic cycloolefin, polycyclic cyclodiene, polycyclic cyclotriene, etc. may be mentioned. As the monocycloolefin, substituted or unsubstituted cyclopentene and substituted or unsubstituted cyclooctene may be illustrated. As the monocyclodiene, substituted or unsubstituted 1,5-cyclooctadiene may be illustrated. As the monocyclotriene, substituted or unsubstituted 1,5,9-cyclododecatriene may be illustrated. As the polycyclic cycloolefin, substituted or unsubstituted norbornene compound may be illustrated. Among these, cyclopentene is preferable. As the end modified group-containing cycloolefin ring-opening polymer used in the present invention, a polymer comprised only of cyclopentene units or a copolymer comprised of cyclopentene units and monomer units able to be copolymerized with cyclopentene, as the repeating units forming the main chain, is preferable. The ratio of the cyclopentene units in the end modified group-containing cycloolefin ring-opening polymer used in the present invention is preferably 80 mol % or more, more preferably 85 mol % or more, further preferably 90 mol % or more.

The molecular weight of the end modified group-containing cycloolefin ring-opening polymer used in the present invention is not particularly limited, but the value of the weight average molecular weight (Mw), converted to polystyrene, measured by gel permeation chromatography is preferably 100,000 to 1,000,000, more preferably 150,000 to 900,000, further preferably 200,000 to 800,000. By the end modified group-containing cycloolefin ring-opening polymer having such a molecular weight, it is possible to give a cross-linked rubber having excellent mechanical properties.

The ratio (Mw/Mn) of the number average molecular weight (Mn) and the weight average molecular weight (Mw), converted to polystyrene, of the end modified group-containing cycloolefin ring-opening polymer used in the present invention measured by gel permeation chromatography is not particularly limited, but is usually 4.0 or less, preferably 3.5 or less, more preferably 3.0 or less. By having such an Mw/Mn, it is possible to give a cross-linked rubber having excellent mechanical properties.

In the double bonds present in the repeating units foaming the end modified group-containing cycloolefin ring-opening polymer used in the present invention, the cis/trans ratio is not particularly limited, but it is usually set to 10/90 to 90/10 in range. From the viewpoint of obtaining a rubber composition for a tire, which is able to give a cross-linked rubber exhibiting excellent characteristics at a low temperature, 30/70 to 90/10 in range is preferable and 40/60 to 90/10 in range is more preferable.

The glass transition temperature of the end modified group-containing cycloolefin ring-opening polymer used in the present invention is −120 to −90° C., preferably −117 to −95° C., more preferably −115 to −100° C. If the glass transition temperature is too low, the obtained cross-linked rubber becomes inferior in the balance between wet grip and low-temperature characteristics, and on the other hand, if the glass transition temperature is too high, the obtained rubber composition becomes high in brittle temperature and inferior in low-temperature characteristics. The glass transition temperature of the end modified group-containing cycloolefin ring-opening polymer can be modulated by, for example, modulating the cis/trans ratio in the double bonds present in the repeating units.

The end modified group-containing cycloolefin ring-opening polymer used in the present invention may have a melting point. When the end modified group-containing cycloolefin ring-opening polymer has a melting point, the melting point is preferably 0° C. or less, more preferably −10° C. or less. The presence or absence of the melting point of the end modified group-containing cycloolefin ring-opening polymer, and the melting point, if present, can be modulated by modulating the cis/trans ratio in the double bonds present in the repeating units, etc.

The end modified group-containing cycloolefin ring-opening polymer used in the present invention has a modified group at an end of the polymer chain thereof, and such a modified group is not particularly limited, but is preferably a functional group containing any atom selected from the group consisting of atoms of Group XV of the Periodic Table, atoms of Group XVI of the Periodic Table, and a silicon atom. By containing the end modified group, the abrasion resistance and the low heat buildup property of the obtained cross-linked rubber can be enhanced.

The functional group for forming the end modified group is more preferably a functional group containing any atom selected from the group consisting of a nitrogen atom, an oxygen atom, a phosphorus atom, a sulfur atom and a silicon atom from the viewpoint that affinity with silica can be enhanced to thereby more enhance the abrasion resistance and the low heat buildup property of the obtained cross-linked rubber. Among these, a functional group containing any atom selected from the group consisting of a nitrogen atom, an oxygen atom and a silicon atom is further preferable.

As the functional group containing a nitrogen atom, an amino group, a pyridyl group, an imino group, an amide group, a nitro group, a urethane bound group, or a hydrocarbon group including such any group may be illustrated. As the functional group containing an oxygen atom, a hydroxyl group, a carboxylic acid group, an ether group, an ester group, a carbonyl group, an aldehyde group, an epoxy group, or a hydrocarbon group including such any group may be illustrated. As the functional group containing a silicon atom, an alkylsilyl group, an oxysilyl group, a silanol group, or a hydrocarbon group including such any group may be illustrated. As the functional group containing a phosphorus atom, a phosphoric acid group, a phosphino group, or a hydrocarbon group including such any group may be illustrated. As the functional group containing a sulfur atom, a sulfonyl group, a thiol group, a thioether group, or a hydrocarbon group including such any group may be illustrated. Further, the modified group may be a functional group containing a plurality of the above groups. Among these, from the viewpoint that the abrasion resistance and the low heat buildup property of the obtained cross-linked rubber can be more enhanced, as a specific example of a particularly suitable functional group, an amino group, a pyridyl group, an imino group, an amide group, a hydroxyl group, a carboxylic acid group, an aldehyde group, an epoxy group, an oxysilyl group, a silanol group, or a hydrocarbon group including such any group may be illustrated, and an oxysilyl group is particularly preferable.

The end modified group-containing cycloolefin ring-opening polymer used in the present invention may be one in which the modified group is introduced to only one polymer chain end (single end), or may be one in which the modified group is introduced to both polymer chain ends (both ends). Further, these may be mixed.

The synthesis method of the end modified group-containing cycloolefin ring-opening polymer used in the present invention is not particularly limited as long as the intended polymer is obtained, and such a polymer may be synthesized by an ordinary method, but can be synthesized by, for example, a method described below.

That is, the end modified group-containing cycloolefin ring-opening polymer used in the present invention can be obtained by, for example, ring-opening polymerization of the cycloolefin in the presence of a polymerization catalyst including a transition metal compound (A) of Group VI of the Periodic Table and a organoaluminum compound (B) represented by the following formula (4).

$$(R^{21})_{3-p}Al(OR^{22})_p \qquad (4)$$

where, in the formula (4), each of $R^{21}$ and $R^{22}$ represents a hydrocarbon group having 1 to 20 carbon atoms, and "p" is $0<p<3$.

The transition metal compound (A) of Group VI of the Periodic Table is a compound having a transition metal atom of Group VI of the Periodic Table (Long-Period Periodic Table, the same applies to the following), specifically, a compound having a chromium atom, a molybdenum atom or a tungsten atom, preferably a compound having a molybdenum atom, or a compound having a tungsten atom, in particular, more preferably a compound having a tungsten atom from the viewpoint of having a high solubility in the cycloolefin. Further, the transition metal compound (A) of Group VI of the Periodic Table may be a compound having any transition metal atom of Group VI of the Periodic Table and is not particularly limited, but halide, alcoholate, arylate, oxylate, etc. of any transition metal atom of Group VI of the Periodic Table may be illustrated. Among these, halide is preferable from the viewpoint of having a high polymerization activity.

As specific examples of such a transition metal compound (A) of Group VI of the Periodic Table, a molybdenum compound such as molybdenum pentachloride, molybdenum oxotetrachloride and molybdenum (phenylimide)tetrachloride; a tungsten compound such as tungsten hexachloride, tungsten oxotetrachloride, tungsten (phenylimide) tetrachloride, monocatecholate tungsten tetrachloride, bis(3, 5-di-tert-butyl)catecholate tungsten dichloride, bis(2-chloroetherate)tetrachloride and tungsten oxotetraphenolate; may be mentioned.

The amount of use of the transition metal compound (A) of Group VI of the Periodic Table in tams of the molar ratio of "transition metal atom of Group VI in the polymerization catalyst: the cycloolefin" is usually 1:100 to 1:200,000, preferably 1:200 to 1:150,000, more preferably 1:500 to 1:100,000 in range. If the amount of use of the transition metal compound (A) of Group VI of the Periodic Table is too small, sometimes the polymerization reaction will not sufficiently proceed. On the other hand, if too large, removal of the catalyst residue from the cycloolefin ring-opening polymer will become difficult, and sometimes the heat resistance and the cold resistance of the obtained cross-linked rubber will be deteriorated.

The organoaluminum compound (B) is the compound represented by the above formula (4). As specific examples of the hydrocarbon group having 1 to 20 carbon atoms represented by $R^{21}$ and $R^{22}$ in the formula (4), an alkyl group such as methyl group, ethyl group, isopropyl group, n-propyl group, isobutyl group, n-butyl group, t-butyl group, n-hexyl group and cyclohexyl group; an aryl group such as phenyl group, 4-methylphenyl group, 2,6-dimethylphenyl group, 2,6-diisopropylphenyl group and naphthyl group; etc. may be mentioned. Note that, the groups represented by $R^{21}$ and $R^{22}$ in the compound represented by the formula (4) may be the same or may be different, but from the viewpoint that the cis ratio of the obtained cycloolefin ring-opening polymer can be raised, in the present invention, at least $R^{22}$ of $R^{21}$ and $R^{22}$ preferably represents an alkyl group having 4 or more carbon atoms consecutively bonded together, particularly more preferably n-butyl group, 2-methyl-pentyl group, n-hexyl group, cyclohexyl group, n-octyl group or n-decyl group.

In the above formula (4), "p" is $0<p<3$. That is, in the above formula (4), the compositional ratio of $R^{21}$ and $OR^{22}$ can be any value in each range of $0<3-p<3$ and $0<p<3$, but "p" is preferably $0.5<p<1.5$ from the viewpoint that the polymerization activity can be increased and also the cis ratio of the obtained cycloolefin ring-opening polymer can be increased.

The organoaluminum compound (B) represented by the above formula (4) can be synthesized by, for example, a reaction of trialkyl aluminum and alcohol as shown in the following formula (5).

$$(R^{21})_3Al + pR^{22}OH \rightarrow (R^{21})_{3-p}Al(OR^{22})_p + (R^{21})_pH \qquad (5)$$

Note that, in the above formula (4), "p" can be arbitrarily controlled by defining the reaction ratio of corresponding trialkyl aluminum and alcohol as shown in the above formula (5).

The amount of use of the organoaluminum compound (B) is preferably 0.1 to 100 times by mole with respect to the transition metal atom of Group VI of the Periodic Table foaming the transition metal compound (A) of Group VI of the Periodic Table, more preferably 0.2 to 50 times by mole, further preferably 0.5 to 20 times by mole, but varies depending on the type of the organoaluminum compound (B) which is used. If the amount of use of the organoaluminum compound (B) is too small, sometimes the polymerization activity will be insufficient, and if too large, a side reaction tends to occur during ring-opening polymerization.

When using the polymerization catalyst including the transition metal compound (A) of Group VI of the Periodic Table and the organoaluminum compound (B) represented by the formula (4), the polymerization catalyst may further contain, in addition to these components, esters and/or ethers (C).

As specific examples of the esters and/or ethers (C), ethers such as diethyl ether, tetrahydrofuran, ethyleneglycol diethyl ether and 1,4-dioxane; esters such as ethyl acetate, butyl acetate, amyl acetate, octyl acetate, 2-chloroethyl acetate, methyl acetylacrylate, ε-caprolactone, dimethyl glutarate, σ-hexanolactone and diacetoxyethane; etc. may be mentioned. Among these, 1,4-dioxane and ethyl acetate are preferable from the viewpoint that the effect of addition can be more increased. Such esters and/or ethers (C) may be used respectively alone or as two types or more combined.

Ring-opening polymerization of the cycloolefin can be performed by using the polymerization catalyst including the transition metal compound (A) of Group VI of the Periodic Table and the organoaluminum compound (B), as well as the esters and/or ethers (C) used in accordance with need, and bringing them into contact with the cycloolefin. The method of performing such ring-opening polymerization is not particularly limited, but for example, the method of performing ring-opening polymerization of the cycloolefin by addition of the transition metal compound (A) of Group VI of the Periodic Table in the presence of the cycloolefin and the organoaluminum compound (B), and the esters and/or ethers (C) used in accordance with need may be mentioned. Alternatively, ring-opening polymerization of the cycloolefin may be performed by mixing the transition metal compound (A) of Group VI of the Periodic Table and the esters or ethers (C) used in accordance with need, in advance, and adding thereto the cycloolefin and then the organoaluminum compound (B). Furthermore, ring-opening polymerization of the cycloolefin may be performed by mixing the transition metal compound (A) of Group VI of the Periodic Table and the organoaluminum compound (B), and, in accordance with need, the esters and/or ethers (C) in advance, and adding thereto the cycloolefin.

The ring-opening polymerization reaction may be pertained in no solvent or in a solution. When the ring-opening polymerization reaction is performed in a solution, the solvent here used is not particularly limited as long as it is inert in the polymerization reaction and can dissolve the cycloolefin used in ring-opening polymerization and the above polymerization catalyst, but, for example, a hydrocarbon-based solvent or a halogen-based solvent may be mentioned. As specific examples of the hydrocarbon-based solvent, for example, aromatic hydrocarbon such as benzene, toluene, xylene and ethylbenzene; aliphatic hydrocarbon such as n-hexane, n-heptane and n-octane; alicyclic hydrocarbon such as cyclohexane, cyclopentane and methylcyclohexane; etc. may be mentioned. As specific examples of the halogen-based solvent, alkyl halogen such as dichloromethane and chloroform; aromatic halogen such as chlorobenzene and dichlorobenzene; etc. may be mentioned.

A compound having a functional group and having one olefinic carbon-carbon double bond having metathesis reactivity may be present in the polymerization reaction system of the ring-opening polymerization reaction, to thereby introduce a modified group to a polymer chain end of the cycloolefin ring-opening polymer. For example, when an oxysilyl group is demanded to be introduced to a polymer chain end of the cycloolefin ring-opening polymer, an oxysilyl group-containing olefinically unsaturated hydrocarbon may be present in the polymerization reaction system.

With respect to examples of such an oxysilyl group-containing olefinically unsaturated hydrocarbon, as a compound which is able to introduce the modified group to only one polymer chain end (single end) of the cycloolefin ring-opening polymer, an alkoxysilane compound such as vinyl(trimethoxy)silane, vinyl(triethoxy)silane, allyl (trimethoxy)silane, allyl (methoxy) (dimethyl) silane, allyl (triethoxy) silane, allyl (ethoxy) (dimethyl) silane, styryl (trimethoxy) silane, styryl(triethoxy)silane, 2-styrylethyl (triethoxy)silane, allyl(triethoxysilylmethyl)ether and allyl (triethoxysilylmethyl) (ethyl)amine; an aryloxysilane compound such as vinyl(triphenoxy)silane, allyl(triphenoxy) silane and allyl(phenoxy) (dimethyl)silane; an acyloxysilane compound such as vinyl(triacetoxy)silane, allyl(triacetoxy) silane, allyl(diacetoxy)methylsilane and allyl(acetoxy) (dimethyl)silane; an alkylsiloxysilane compound such as allyltris(trimethylsiloxy)silane; an arylsiloxysilane compound such as allyltris(triphenylsiloxy)silane; a polysiloxane compound such as 1-allylheptamethyltrisiloxane, 1-allylnonamethyltetrasiloxane, 1-allylnonamethylcyclopentasiloxane and 1-allylundecamethylcyclohexasiloxane; etc. may be mentioned. As a compound which is able to introduce the modified groups to both polymer chain ends (both ends) of the cycloolefin ring-opening polymer, an alkoxysilane compound such as 1,4-bis(trimethoxysilyl)-2-butene, 1,4-bis(triethoxysilyl)-2-butene and 1,4-bis(trimethoxysilylmethoxy)-2-butene; an aryloxysilane compound such as 1,4-bis (triphenoxysilyl)-2-butene; an acyloxysilane compound such as 1,4-bis(triacetoxysilyl)-2-butene; an alkylsiloxysilane compound such as 1,4-bis[tris(trimethylsiloxy)silyl]-2-butene; an arylsiloxysilane compound such as 1,4-bis[tris (triphenylsiloxy)silyl]-2-butene; a polysiloxane compound such as 1,4-bis(heptamethyltrisiloxy)-2-butene and 1,4-bis (undecamethylcyclohexasiloxy)-2-butene; etc. may be mentioned.

The amount of use of the functional group-containing olefinically unsaturated hydrocarbon such as the oxysilyl group-containing olefinically unsaturated hydrocarbon may be appropriately selected depending on the molecular weight of the end modified group-containing cycloolefin ring-opening polymer to be produced, but is usually 1/100 to 1/100,000 as the molar ratio with respect to the cycloolefin, preferably 1/200 to 1/50,000, more preferably 1/500 to 1/10,000 in range. Note that, the functional group-containing olefinically unsaturated hydrocarbon not only serves to introduce the modified group to a polymer chain end of the cycloolefin ring-opening polymer, but also acts as a molecular weight adjuster.

The polymerization reaction temperature is not particularly limited, but is preferably −100° C. or more, more preferably −50° C. or more, further preferably 0° C. or more, particularly preferably 20° C. or more. The upper limit of the polymerization reaction temperature is not particularly limited, but is preferably less than 100° C., more preferably less than 90° C., further preferably less than 80° C., particularly preferably less than 70° C. The polymerization reaction time is also not particularly limited, but is preferably 1 minute to 72 hours, more preferably 10 minutes to 20 hours.

To the end modified group-containing cycloolefin ring-opening polymer obtained by the polymerization reaction, an antioxidant such as a phenol-based stabilizer, a phosphorus-based stabilizer, and a sulfur-based stabilizer may be added, as desired. The amount of the antioxidant added may be suitably selected in accordance with the type, etc. Further, extension oil may be compounded thereto, as desired. When the end modified group-containing cycloolefin ring-opening polymer is obtained as a polymer solution, a known recovery method may be employed for recovering the polymer from the polymer solution. For example, the method of using steam stripping etc. to separate the solvent, then separating a solid by filtration and further drying it to obtain solid state rubber may be employed.

The rubber composition for a tire of the present invention contains, in addition to the end modified group-containing cycloolefin ring-opening polymer which can be obtained as above, an end modified group-containing solution polymerized conjugated diene polymer. The end modified group-containing solution polymerized conjugated diene polymer contained as an essential component in the rubber composition for a tire of the present invention is a polymer obtained by polymerizing a monomer mixture containing a conjugated diene monomer as a main component in the state where the mixture is dissolved in a solvent (that is, polymer obtained by solution polymerization), the polymer having a glass transition temperature of −60 to −10° C. and having an aromatic vinyl monomer units content ratio of more than 30 wt % and 50 wt % or less and containing an end modified group. In the rubber composition for a tire of the present invention, by using such an end modified group-containing solution polymerized conjugated diene polymer in combination with the end modified group-containing cycloolefin ring-opening polymer, and compounding, to these, silica and a silane coupling agent including a monosulfide group and/or a thiol group, described below, in a predetermined ratio, it is possible to give a cross-linked rubber excellent in abrasion resistance and low heat buildup property. Note that, when a conjugated diene polymer obtained by emulsion polymerization is used instead of the end modified group-containing solution polymerized conjugated diene polymer obtained by solution polymerization, such an effect of improving abrasion resistance and low heat buildup property cannot be achieved.

The end modified group-containing solution polymerized conjugated diene polymer used in the present invention has conjugated diene monomer units and aromatic vinyl monomer units as essential monomer units. The conjugated diene monomer forming the conjugated diene monomer units is not particularly limited, but for example, 1,3-butadiene, isoprene (2-methyl-1,3-butadiene), 2,3-dimethyl-1,3-butadiene, 2-chloro-1,3-butadiene, 1,3-pentadiene, 1,3-hexadiene, etc. may be used. Among these, 1,3-butadiene or isoprene is preferable, and 1,3-butadiene and isoprene are more preferably used in combination. These conjugated diene monomers may be used respectively alone or as two types or more combined.

The aromatic vinyl monomer forming the aromatic vinyl monomer units is not particularly limited, but for example, styrene, α-methylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, vinylnaphthalene, dimethylaminomethylstyrene, dimethylaminoethylstyrene, etc. may be used. Among these, styrene, α-methylstyrene or 4-methylstyrene is preferable, and styrene is more preferable. These aromatic vinyl monomers may be used respectively alone or as two types or more combined.

In the end modified group-containing solution polymerized conjugated diene polymer used in the present invention, from the viewpoint that the obtained cross-linked rubber can be made excellent in abrasion resistance and low heat buildup property, an aromatic vinyl monomer units content ratio (weight ratio of the aromatic vinyl monomer units to the total monomer units) is more than 30 wt % and 50 wt % or less, preferably 33 to 48 wt %, more preferably 35 to 45 wt %.

In the present invention, by setting the aromatic vinyl monomer units content to fall within such a range, the strength of the obtained cross-linked rubber can be increased to thereby more increase abrasion resistance performance when used as a tire. Note that, the abrasion resistance performance here used means resistance performance with respect to abrasion occurring in a region where the level of energy for abrasion of a tire (friction energy) is low (low severity), and abrasion occurring in such a region where the level of friction energy is low is known to correlate with abrasion in an actual vehicle. In order to evaluate the abrasion resistance performance with respect to such abrasion occurring in a low friction energy region, it is necessary to perform an abrasion test in a low friction energy region, specifically, it is necessary to perform an abrasion test under a condition where the slip ratio based on the following expressions is set to be as low as about 1 to 5%. Note that, as an abrasion tester able to perform an abrasion test under such a condition where the slip ratio is set to be low, for example, an FPS abrasion tester manufactured by Ueshima Seisakusho Co., Ltd., etc. may be mentioned.

Slip ratio=(Vs−Vd)/Vs×100(%)

Vs: speed of peripheral surface (peripheral speed) of rubber test piece (cm/min)

Vd: peripheral speed of grinding stone (cm/min)

On the other hand, if the aromatic vinyl monomer units content ratio is too low, such an abrasion resistance performance, in particular, the suppression effect of the abrasion occurring in a low friction energy level region cannot be achieved, and thus the abrasion in an actual vehicle becomes inferior. On the other hand, if the aromatic vinyl monomer units content ratio is too high, the balance between the wet grip and the low heat buildup property of the obtained cross-linked rubber becomes inferior.

The Mooney viscosity ($ML_{1+4}$, 100° C.) of the end modified group-containing solution polymerized conjugated diene polymer used in the present invention is also not particularly limited, but it is preferably 20 to 90, more preferably 30 to 80.

The glass transition temperature of the end modified group-containing solution polymerized conjugated diene polymer used in the present invention is −60 to −10° C., preferably −50 to −15° C., more preferably −40 to −20° C. If the glass transition temperature of the end modified group-containing solution polymerized conjugated diene polymer is too low, the improvement effect of abrasion resistance and wet grip in the obtained cross-linked rubber cannot be achieved, and on the other hand, if the glass transition temperature is too high, low heat buildup property becomes inferior.

The end modified group-containing solution polymerized conjugated diene polymer used in the present invention has a modified group at a polymer chain end, and such a modified group is not particularly limited, but it is preferably a functional group containing a silicon atom, particularly preferably a modified group famed by a reaction of a silane compound represented by any of general formulas (1) to (3) described below. The method of introducing the modified group to a polymer chain end is not particularly limited, but for example, the method of obtaining a solution polymerized conjugated diene polymer chain having an active end by solution polymerization and performing a reaction of a modifying agent for introduction of the modified group with the active end, etc. may be mentioned.

The end modified group-containing solution polymerized conjugated diene polymer used in the present invention may also be so-called oil-extended rubber to which extension oil is compounded.

In the method of producing the end modified group-containing solution polymerized conjugated diene polymer used in the present invention, for example, such a polymer can be produced by polymerizing the monomer mixture containing a conjugated diene monomer and an aromatic vinyl monomer in an inert solvent by use of a polymerization initiator to thereby obtain a polymer chain having an active end, and modifying the polymer chain having an active end.

As the inert solvent to be used, any solvent can be used without any particular limitation as long as it is usually used in solution polymerization and does not inhibit the polymerization reaction. As specific examples thereof, for example, an aliphatic hydrocarbon such as butane, pentane, hexane and 2-butene; an alicyclic hydrocarbon such as cyclopentane, cyclohexane and cyclohexene; an aromatic hydrocarbon such as benzene, toluene and xylene; may be mentioned. The amount of use of the inert solvent corresponds to a ratio so that the monomer concentration is usually 1 to 50 wt %, preferably 10 to 40 wt %.

The polymerization initiator is not particularly limited as long as it can polymerize the monomer mixture containing a conjugated diene monomer and an aromatic vinyl monomer to give the polymer chain having an active end, but for example, an organic alkali metal compound and an organic alkali earth metal compound, or a polymerization initiator including a compound of metal of the lanthanide series as a main catalyst is preferably used. As specific examples of the organic alkali metal compound, for example, an organomonolithium compound such as n-butyllithium, sec-butyllithium, t-butyllithium, hexyllithium, phenyllithium and stilbenelithium; an organic polyvalent lithium compound such as dilithiomethane, 1,4-dilithiobutane, 1,4-dilithio-2-ethylcyclohexane and 1,3,5-trilithiobenzene; an organosodium compound such as sodium naphthalene; and an organopotassium compound such as potassium naphthalene may be mentioned. As the organic alkali earth metal compound, n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, diethylaminobarium, barium stearate, ketyl barium, etc. may be mentioned. As the polymerization initiator including a compound of metal of the lanthanide series as a main catalyst, a polymerization initiator comprised of, as a main catalyst, a salt of metal of the lanthanide series comprised of metal of the lanthanide series such as lanthanum, cerium, praseodymium, neodymium, samarium and gadolinium, and carboxylic acid or phosphorus-containing organic acid, and a co-catalyst such as an alkyl aluminum compound, an organoaluminum hydride compound and an organoaluminum halide compound may be mentioned. Among such polymerization initiators, an organolithium compound, in particular, an organomonolithium compound is preferably used. Note that, an organic alkali metal compound may also react with a secondary amine such as dibutylamine, dihexylamine, dibenzylamine, pyrrolidine, hexamethyleneimine and heptamethyleneimine (preferably, pyrrolidine, hexamethyleneimine, heptamethyleneimine) in advance and then be used as an organic alkali metal amide compound. These polymerization initiators may be used respectively alone or as two types or more combined.

The amount of use of the polymerization initiator is usually 1 to 50 mmol with respect to 1000 g of the monomer mixture used in the polymerization, preferably 2 to 20 mmol, more preferably 4 to 15 mmol in range.

In order to modulate the vinyl bond content of the conjugated diene monomer units, when the monomer mixture is polymerized, a polar compound is preferably added to the inert solvent used in the polymerization. As the polar compound, for example, an ether compound such as dibutyl ether, tetrahydrofuran and ditetrahydrofurylpropane; tertiary amine such as tetramethylethylenediamine; an alkali metal alkoxide; a phosphine compound, etc. may be mentioned. Among these, an ether compound or tertiary amine is preferable, tertiary amine is more preferable, and tetramethylethylenediamine is particularly preferably used. The amount of use of the polar compound is preferably 0.01 to 100 mol with respect to 1 mol of the polymerization initiator, more preferably 0.3 to 30 mol in range. When the amount of use of the polar compound falls within the ranges, the vinyl bond content of the conjugated diene monomer units is easily modulated, and defect due to deactivation of the polymerization initiator is also hardly caused.

The polymerization temperature is usually −78 to 150° C., preferably 0 to 100° C., more preferably 30 to 90° C. in range. As the polymerization system, any system such as a batch system or a continuous system can be adopted.

The polymer chain having an active end obtained by such a polymerization reaction can react with a modifying agent to introduce the modified group, thereby the end modified group-containing solution polymerized conjugated diene polymer used in the present invention can be obtained.

The modifying agent is not particularly limited, but at least one silane compound among silane compounds represented by the following general formulas (1) to (3) is preferably used from the viewpoint that the abrasion resistance and the low heat buildup property of the obtained cross-linked rubber can be more increased.

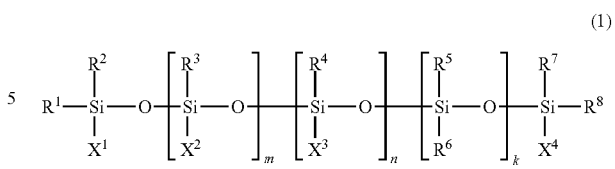

In the above general formula (1), each of $R^1$ to $R^8$ represents an alkyl group having 1 to 6 carbon atoms or an aryl group having 6 to 12 carbon atoms, and $R^1$ to $R^8$ may be the same as or different from each other. Each of $X^1$ and $X^4$ represents a functional group able to react with the active end of the polymer chain, an alkyl group having 1 to 6 carbon atoms, or an aryl group having 6 to 12 carbon atoms, and $X^1$ and $X^4$ may be the same as or different from each other. $X^2$ represents a functional group able to react with the active end of the polymer chain. $X^3$ represents a group containing 2 to 20 alkyleneglycol repeating units. "m" is an integer of 3 to 200, "n" is an integer of 0 to 200, and "k" is an integer of 0 to 200.

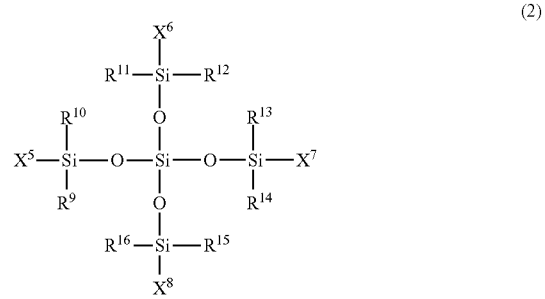

In the above general formula (2), each of $R^9$ to $R^{16}$ represents an alkyl group having 1 to 6 carbon atoms or an aryl group having 6 to 12 carbon atoms, and $R^9$ to $R^{16}$ may be the same as or different from each other. Each of $X^5$ to $X^8$ represents a functional group able to react with the active end of the polymer chain.

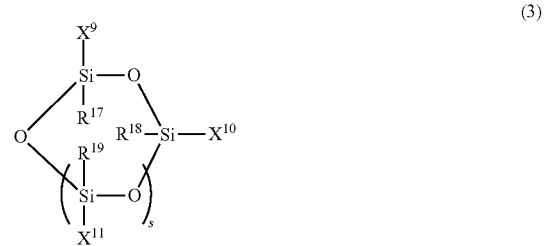

In the above general formula (3), each of $R^{17}$ to $R^{19}$ represents an alkyl group having 1 to 6 carbon atoms or an aryl group having 6 to 12 carbon atoms, and $R^{17}$ to $R^{19}$ may be the same as or different from each other. Each of $X^9$ to $X^{11}$ represents a functional group able to react with the active end of the polymer chain. "s" is an integer of 1 to 18.

In the polyorganosiloxane represented by the above general formula (1), as the alkyl group having 1 to 6 carbon atoms forming each of $R^1$ to $R^8$, and $X^1$ and $X^4$, for example, a methyl group, ethyl group, n-propyl group, isopropyl group, butyl group, pentyl group, hexyl group, cyclohexyl group, etc. may be mentioned. As the aryl group having 6 to 12 carbon atoms, for example, a phenyl group, methylphenyl group, etc. may be mentioned. Among these alkyl groups and aryl groups, a methyl group is particularly preferable.

The functional group able to react with the active end of the polymer chain, forming each of $X^1$, $X^2$ and $X^4$, is not particularly limited, but an alkoxyl group having 1 to 5 carbon atoms, a hydrocarbon group containing a 2-pyrrolidonyl group, and an epoxy group-containing group having 4 to 12 carbon atoms are preferable.

As the alkoxyl group having 1 to 5 carbon atoms, for example, a methoxy group, ethoxy group, propoxy group, isopropoxy group, butoxy group, etc. may be mentioned. Among these, a methoxy group is preferable.

As the hydrocarbon group containing a 2-pyrrolidonyl group, a group represented by the following general formula (6) may be preferably mentioned.

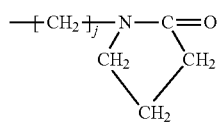

(6)

In the above general formula (6), "j" is an integer of 2 to 10, and in particular, "j" is preferably 2.

As the epoxy group-containing group having 4 to 12 carbon atoms, a group represented by the following general formula (7) may be mentioned.

-$Z^1$-$Z^2$-E (7)

In the above general formula (7), $Z^1$ represents an alkylene group or an alkylarylene group having 1 to 10 carbon atoms, $Z^2$ represents a methylene group, a sulfur atom or an oxygen atom, and E represents a substituted hydrocarbon group having 2 to 10 carbon atoms and having an epoxy group. Among these, one in which $Z^2$ represents an oxygen atom is preferable, one in which $Z^2$ represents an oxygen atom and E represents a glycidyl group is more preferable, and one in which $Z^1$ represents an alkylene group having 3 carbon atoms, $Z^2$ represents an oxygen atom and E represents a glycidyl group is particularly preferable.

In the polyorganosiloxane represented by general formula (1) before the reaction with the active end of the polymer chain, when at least one of $X^1$, $X^2$ and $X^4$ represents an alkoxyl group having 1 to 5 carbon atoms, it is considered that, when the polyorganosiloxane reacts with the polymer chain, the bond between a silicon atom and an oxygen atom of the alkoxyl group is dissociated so that the polymer chain directly bonds to the silicon atom, thereby a single bond is foiled.

In the polyorganosiloxane represented by general formula (1) before the reaction with the active end of the polymer chain, when at least one of $X^1$, $X^2$ and $X^4$ represents a hydrocarbon group containing a 2-pyrrolidonyl group, it is considered that, when the polyorganosiloxane reacts with the polymer chain, the carbon-oxygen bond of the carbonyl group forming the 2-pyrrolidonyl group is dissociated to form a structure in which the polymer chain is bonded to the carbon atom.

Furthermore, in the polyorganosiloxane represented by general formula (1) before the reaction with the active end of the polymer chain, when at least one of $X^1$, $X^2$ and $X^4$ represents an epoxy group-containing group having 4 to 12 carbon atoms, it is considered that, when the polyorganosiloxane reacts with the polymer chain, the carbon-oxygen bond forming the epoxy ring is dissociated to form a structure in which the polymer chain is bonded to the carbon atom.

In the polyorganosiloxane represented by the above general formula (1), each of $X^1$ and $X^4$ preferably represents an epoxy group-containing group having 4 to 12 carbon atoms, or an alkyl group having 1 to 6 carbon atoms, among the above. $X^2$ preferably represents an epoxy group-containing group having 4 to 12 carbon atoms, among the above.

In the polyorganosiloxane represented by the above general formula (1), $X^3$, that is, the group containing 2 to 20 alkyleneglycol repeating units is preferably a group represented by the following general formula (8).

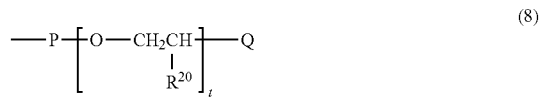

(8)

In the above general formula (8), "t" is an integer of 2 to 20, P represents an alkylene group or an alkylarylene group having 2 to 10 carbon atoms, $R^{20}$ represents a hydrogen atom or a methyl group, and Q represents an alkoxyl group or an aryloxy group having 1 to 10 carbon atoms. Among these, one in which "t" is an integer of 2 to 8, P represents an alkylene group having 3 carbon atoms, R represents a hydrogen atom and Q represents a methoxy group is preferable.

In the polyorganosiloxane represented by the above general formula (1), "m" is an integer of 3 to 200, preferably 20 to 150, more preferably 30 to 120. In the polyorganosiloxane represented by the above general formula (1), "n" is an integer of 0 to 200, preferably an integer of 0 to 150, more preferably an integer of 0 to 120. "k" is an integer of 0 to 200, preferably an integer of 0 to 150, more preferably an integer of 0 to 120. Furthermore, the total of "m", "n" and "k" is preferably 400 or less, more preferably 300 or less, particularly preferably 250 or less. When "n", "n" and "k" are set to fall within the above ranges, processability can become more suitable.

In addition, $R^9$ to $R^{19}$ and $X^5$ to $X^{11}$ in the above general formula (2) and the above general formula (3) may be the same as $R^1$ to $R^8$ and $X^1$ to $X^4$ in the above general formula (1).

The amount of use of the modifying agent is usually more than 0.001 mol and less than 0.1 mol with respect to 1 mol of the polymerization initiator which is used, preferably more than 0.005 mol and less than 0.09 mol, more preferably more than 0.01 mol and less than 0.08 mol.

The modifying agent is preferably added to the polymerization system because, if added, it is dissolved in the inert solvent used in the polymerization to uniformly react with the active end of the polymer chain having an active end easily. The solution concentration is preferably 1 to 50 wt %. The time at which the modifying agent reacts with the polymer chain having an active end is preferably when the polymerization reaction is substantially completed, and is preferably after the polymerization reaction is substantially completed and before the polymer chain having an active end is gelated due to a side reaction or a chain transfer reaction by impurities in the polymerization system occurs. Note that, before the modifying agent reacts with the polymer chain having an active end, a coupling agent usually used may be added to the polymerization system to partially make an active end of the polymer chain inert, as long as the effects of the present invention are not impaired.

With respect to the reaction conditions where the modifying agent reacts with the polymer chain having an active end, the reaction temperature is usually 0 to 100° C., preferably 30 to 90° C. in range and the reaction time is usually 1 to 120 minutes, preferably 2 to 60 minutes in range.

After the modifying agent reacts with the polymer chain having an active end, an alcohol such as methanol or isopropanol, or water is preferably added thereto to deactivate the active end.

The rubber composition for a tire of the present invention includes 15 to 55 wt % of the above end modified group-containing cycloolefin ring-opening polymer with respect to the total rubber component, preferably 20 to 55 wt %, more preferably 25 to 55 wt %. The rubber composition for a tire of the present invention includes 45 to 85 wt % of the above end modified group-containing solution polymerized conjugated diene polymer with respect to the total rubber component, preferably 45 to 80 wt %, more preferably 45 to 75 wt %. In both the cases where the ratio of the end modified group-containing cycloolefin ring-opening polymer in the rubber component is too small and where the ratio of the end modified group-containing solution polymerized conjugated diene polymer in the rubber component is too small, the improvement effect of the abrasion resistance and the low heat buildup property of the obtained cross-linked rubber is insufficient. Note that, the ratios of these are determined based on the weights of the polymers foiling the rubber component in the end modified group-containing cycloolefin ring-opening polymer and the end modified group-containing solution polymerized conjugated diene polymer, and are determined, for example, with the weight of extension oil, etc. excluded.

The rubber composition for a tire of the present invention may contain, as a rubber component, rubber other than the end modified group-containing cycloolefin ring-opening polymer and the end modified group-containing solution polymerized conjugated diene polymer. As the rubber other than the end modified group-containing cycloolefin ring-opening polymer and the end modified group-containing solution polymerized conjugated diene polymer, for example, natural rubber (NR), polyisoprene rubber (IR), emulsion polymerized SBR (emulsion polymerized styrene-butadiene rubber), low cis BR (polybutadiene rubber), high cis BR, high trans BR (trans bond content in butadiene part 70 to 95%), styrene-isoprene copolymer rubber, butadiene-isoprene copolymer rubber, emulsion polymerized styrene-acrylonitrile-butadiene copolymer rubber, acrylonitrile-butadiene copolymer rubber, polyisoprene-SBR block copolymer rubber, polystyrene-polybutadiene-polystyrene block copolymer, acrylic rubber, epichlorohydrin rubber, fluororubber, silicone rubber, ethylene-propylene rubber, urethane rubber, etc. may be mentioned. Among these, NR, BR, IR, and emulsion polymerized SBR are preferably used. These rubbers can be used respectively alone or as two types or more combined. From the viewpoint of improving the abrasion resistance and the low heat buildup property of the cross-linked rubber obtained by using the rubber composition for a tire of the present invention, however, the content of the rubber other than the end modified group-containing cycloolefin ring-opening polymer and the end modified group-containing solution polymerized conjugated diene polymer in the rubber composition for a tire of the present invention is preferably 40 wt % or less with respect to the total rubber component, preferably 35 wt % or less, more preferably 30 wt % or less.

The rubber composition for a tire of the present invention contains silica in addition to the above end modified group-containing cycloolefin ring-opening polymer and end modified group-containing solution polymerized conjugated diene polymer. The silica is not particularly limited, but dry type white carbon, wet type white carbon, colloidal silica, precipitated silica, etc. may be mentioned.

The nitrogen adsorption specific surface area of the silica is preferably 50 to 300 $m^2/g$, more preferably 80 to 220 $m^2/g$, particularly preferably 100 to 170 $m^2/g$. If the specific surface area is in these ranges, the obtained cross-linked rubber can be more excellent in low heat buildup property. Further, the pH of the silica is preferably less than 7, more preferably 5 to 6.9. Note that, the nitrogen adsorption specific surface area can be measured by BET method based on ASTM D3037-81.

The amount of the silica in the rubber composition for a tire of the present invention is 30 to 200 parts by weight with respect to 100 parts by weight of the rubber component, preferably 40 to 150 parts by weight, more preferably 50 to 100 parts by weight. If the amount of the silica is too small, the wet grip and the abrasion resistance of the obtained cross-linked rubber are deteriorated. Further, if the amount is too large, the low heat buildup property thereof is deteriorated.

The rubber composition for a tire of the present invention further contains a silane coupling agent including a monosulfide group and/or a thiol group. As the silane coupling agent including a monosulfide group and/or a thiol group, for example, 3-octanoylthio-1-propyl-triethoxysilane, 3-octanoylthio-1-propyl-trimethoxysilane, 3-mercaptopropyltrimethoxysilane, and a compound represented by formula (10) (where, in the formula (10), each L independently represents an alkanediyl group or alkenediyl group having 1 to 9 carbon atoms, "x" is an integer of 1 to 150 and "y" is an integer of 1 to 150) and a compound represented by formula (11) which are used in Examples described below, etc. may be mentioned. These silane coupling agents can be used respectively alone or as two types or more combined.

The amount of the silane coupling agent including a monosulfide group and/or a thiol group in the rubber composition for a tire of the present invention is 0.3 to 20 parts by weight with respect to 100 parts by weight of the silica, preferably 1 to 15 parts by weight, more preferably 5 to 15 parts by weight. If the amount of the silane coupling agent is too small, the abrasion resistance and the low heat buildup property of the obtained cross-linked rubber are deteriorated, and on the other hand, if the amount is too large, slipping at the time of kneading is caused to make dispersing of a compounding agent inferior.

The rubber composition for a tire of the present invention may further contain carbon black as a filler. As the carbon black, furnace black, acetylene black, thermal black, channel black, graphite, etc. may be mentioned. Among these, furnace black is preferably used. As specific examples thereof, SAF, ISAF, ISAF-HS, ISAF-LS, IISAF-HS, HAF, HAF-HS, HAF-LS, T-HS, T-NS, MAF, EhF, etc. may be mentioned. These may be used respectively alone or as two types or more combined.

The nitrogen adsorption specific surface area of the carbon black is preferably 5 to 200 $m^2/g$, more preferably 20 to 130 $m^2/g$, further preferably 40 to 80 $m^2/g$. Further, the amount of adsorption of dibutyl phthalate (DBP) in the carbon black as the filler is preferably 5 to 200 ml/100 g, more preferably 50 to 160 ml/100 g, further preferably 70 to 130 ml/100 g.

When the carbon black is used as the filler, the amount of the carbon black is preferably 1 to 150 parts by weight with respect to 100 parts by weight of the rubber component in the rubber composition for a tire, more preferably 2 to 120 parts by weight, further preferably 5 to 100 parts by weight.

Further, the rubber composition for a tire of the present invention may contain, in addition to the above components, a compounding agent such as a cross-linking agent, cross-linking accelerator, cross-linking activator, antioxidant, activator, process oil, plasticizer, lubricant, filler, tackifier and aluminum hydroxide compounded in necessary amounts by an ordinary method.

As the cross-linking agent, for example, sulfur, sulfur halide, organic peroxide, quinone dioximes, organic polyvalent amine compound, alkylphenol resin having a methylol group, etc. may be mentioned. Among these, sulfur is preferably used. The amount of the cross-linking agent is preferably 1.0 to 5.0 parts by weight with respect to 100 parts by weight of the rubber component in the rubber composition for a tire, more preferably 1.2 to 4.0 parts by weight, particularly preferably 1.4 to 3.0 parts by weight.

As the cross-linking accelerator, for example, a sulfenamide-based cross-linking accelerator such as N-cyclohexyl-2-benzothiazolylsulfenamide, N-t-butyl-2-benzothiazolylsulfenamide, N-oxyethylene-2-benzothiazolylsulfenamide, N-oxyethylene-2-benzothiazolylsulfenamide and N,N'-diisopropyl-2-benzothiazolylsulfenamide; a guanidine-based cross-linking accelerator such as diphenylguanidine, diorthotolylguanidine and orthotolylbiguanidine; a thiourea-based cross-linking accelerator; a thiazole-based cross-linking accelerator; a thiuram-based cross-linking accelerator; a dithiocarbamic acid-based cross-linking accelerator; a xanthogenic acid-based cross-linking accelerator; etc. may be mentioned. Among these, one containing a sulfenamide-based cross-linking accelerator is particularly preferable. These cross-linking accelerators are used respectively alone or as two types or more combined. The amount of the cross-linking accelerator is preferably 0.1 to 15 parts by weight with respect to 100 parts by weight of the rubber component in the rubber composition for a tire, more preferably 0.5 to 5 parts by weight, particularly preferably 1.0 to 4.0 parts by weight.

As the cross-linking activator, for example, a higher fatty acid such as stearic acid, zinc oxide, etc. may be mentioned. The amount of the cross-linking activator is not particularly limited, but, when a higher fatty acid is used as the cross-linking activator, the amount thereof is preferably 0.05 to 15 parts by weight with respect to 100 parts by weight of the rubber component in the rubber composition for a tire, more preferably 0.5 to 5 parts by weight, and when zinc oxide is used as the cross-linking activator, the amount thereof is preferably 0.05 to 10 parts by weight with respect to 100 parts by weight of the rubber component in the rubber composition for a tire, more preferably 0.5 to 3 parts by weight.

As the process oil, for example, a petroleum-based softener such as paraffin, aromatic and naphthene-based softeners; a plant-based softener; fatty acid; etc. may be mentioned. As the other compounding agent, for example, an activator such as diethyleneglycol, polyethyleneglycol and silicone oil; a filler such as calcium carbonate, talc and clay; a tackifier such as a petroleum resin and a cumarone resin; wax; etc. may be mentioned.

In order to obtain the rubber composition for a tire of the present invention, the respective components may be kneaded in accordance with an ordinary method. For example, the intended composition can be obtained by kneading the compounding agents excluding the cross-linking agent and cross-linking accelerator with the rubber component, then mixing the cross-linking agent and cross-linking accelerator with the kneaded material. The kneading temperature when kneading the compounding agents excluding the cross-linking agent and cross-linking accelerator with the rubber component is preferably 80 to 200° C., more preferably 120 to 180° C. Further, the kneading time is preferably 30 seconds to 30 minutes. The cross-linking agent and cross-linking accelerator are usually mixed with the kneaded material after cooling down to 100° C. or less, preferably 80° C. or less. Note that, the rubber composition of the present invention may be obtained by a method of adding the compounding agents to solid rubber and kneading the resultant (dry kneading method), or a method of adding the compounding agents to a solution of rubber and solidifying and drying the resultant (wet kneading method).

A cross-linked rubber obtained by cross-linking the rubber composition for a tire of the present invention is excellent in abrasion resistance and low heat buildup property, and therefore can be, for example, utilized for various tire parts such as treads, carcasses, side walls, and beads in various tires such as all season tires, high performance tires and studless tires, but is particularly suitably used for tire treads. In particular, the cross-linked rubber of the present invention can have an effectively suppressed abrasion in a region where a slip ratio is low (be particularly excellent in abrasion resistance in a region where a slip ratio is low), and therefore can have an effectively suppressed abrasion in an actual vehicle when used for a tire.

EXAMPLES

Hereinafter, the present invention will be explained based on more detailed examples, but the present invention is not limited to these examples. Note that, in the examples, "parts" are based on weight unless otherwise indicated. Further, the tests and evaluations were pertained in accordance with the following descriptions.

[Molecular Weight of Cyclopentene Ring-Opening Polymer]

Using gel permeation chromatography (GPC) (GPC system HLC-8220 (made by Tosoh Corporation)) with tetrahydrofuran as a solvent and an H-type column HZ-M (made by Tosoh Corporation), measurement was performed at a column temperature of 40° C. to find the number average molecular weight (Mn), weight average molecular weight (Mw), and molecular weight distribution (Mw/Mn) of the polymer as values converted to polystyrene.

[Cis/Trans Ratio of Cyclopentene Ring-Opening Polymer]

The ratio was determined by $^{13}$C-NMR spectroscopy.

[Glass Transition Temperature (Tg) of Cyclopentene Ring-Opening Polymer]

Using a differential scanning calorimeter (DSC, made by PerkinElmer Co., Ltd.), the temperature of a measurement sample was sequentially changed as follows: the temperature was raised from 23° C. to 120° C. (heating rate: 100° C./min), kept at 120° C. for 10 minutes, dropped to −120° C. (cooling rate: 100° C./min), kept at −120° C. for 10 minutes, and raised to 23° C. (heating rate: 10° C./min). The average of the on-set values measured twice was defined as the measurement value of the glass transition temperature.

[Ratio of Introduction of Oxysilyl Group in Cyclopentene Ring-Opening Polymer]

Using $^1$H-NMR spectroscopy, the ratio of the peak integral value derived from the oxysilyl group and the peak integral value derived from the carbon-carbon double bond in the cyclopentene ring-opening polymer main chain was found. Based on the ratio of the peak integral values and the measurement value of the number average molecular weight (Mn) measured by GPC, the ratio of introduction of the oxysilyl group [percentage of (number of cyclopentene ring-opening polymer chain ends in which oxysilyl group was introduced/number of cyclopentene ring-opening polymer chain ends)] was calculated.

[Molecular Weight of Styrene Butadiene Isoprene Rubber]

The number average molecular weight (Mn), weight average molecular weight (Mw), and molecular weight distribution (Mw/Mn) of the polymer as values converted to polystyrene were determined by gel permeation chromatography (GPC) (GPC system HLC-8220 (made by Tosoh Corporation)) with tetrahydrofuran as a solvent.

[Styrene Monomer Units Content and Amount of Vinyl Bond in Styrene Butadiene Isoprene Rubber]

The styrene monomer units content and the amount of a vinyl bond were measured by $^1$H-NMR.

[Glass Transition Temperature (Tg) of Styrene Butadiene Isoprene Rubber]

Using a differential scanning calorimeter (DSC, made by PerkinElmer Co., Ltd.), the temperature of a measurement sample was sequentially changed as follows: the temperature was raised from 23° C. to 120° C. (heating rate: 100° C./min), kept at 120° C. for 10 minutes, dropped to −120° C. (cooling rate: 100° C./min), kept at −120° C. for 10 minutes, and raised to 23° C. (heating rate: 10° C./min). The average of the on-set values measured twice was defined as the measurement value of the glass transition temperature.

[Mooney Viscosity of Styrene Butadiene Isoprene Rubber]

The Mooney viscosity (polymer Mooney) of the styrene butadiene isoprene rubber was measured according to JIS K6300 (unit: ($ML_{1+4}$, 100° C.)).

[Evaluation of Abrasion Resistance]

The rubber composition as a sample was cross-linked by pressing at 160° C. for 20 minutes to prepare a cross-linked test piece, and this test piece was subjected to measurement using an FPS abrasion tester (product name "AB-2010", made by Ueshima Seisakusho Co., Ltd.) at a load of 1 kgf and a slip ratio of 3%. This property was represented by an index on the basis that the value of a reference sample (Comparative Example 1 described below) was 100. The larger this index is, the more excellent the abrasion resistance (in particular, abrasion resistance in a region where a slip ratio is low) can be said to be.

[Evaluation of Low Heat Buildup Property]

The rubber composition as a sample was cross-linked by pressing at 160° C. for 20 minutes to prepare a cross-linked test piece. This test piece was subjected to measurement by a viscoelasticity measurement device (product name "ARES-G2", made by TA Instruments) under conditions of a shear strain of 2.0% and a frequency of 10 Hz for measuring the tanδ at 60° C. This property was represented by an index on the basis that the value of a reference sample (Comparative Example 1 described below) was 100. The larger this index is, the more excellent the low fuel consumption property can be said to be.

Reference Example 1

Preparation of Diisobutyl Aluminum Mono(n-hexoxide)/Toluene Solution (2.5 wt %)

In a nitrogen atmosphere, a glass vessel equipped with a stirrer was charged with 88 parts of toluene and 7.8 parts of a 25.4 wt % triisobutyl aluminum/n-hexane solution (made by Tosoh Finechem Corporation). Next, the vessel was cooled to −45° C., and 1.02 parts of n-hexanol (equivalent molar with respect to triisobutyl aluminum) was slowly dropped with vigorous stirring. After that, the resultant was left to stand with stirring until the temperature reached room temperature, to prepare a diisobutyl aluminum mono(n-hexoxide)/toluene solution (2.5 wt %).

Synthesis Example 1

In a nitrogen atmosphere, a glass vessel equipped with a stirrer was charged with 87 parts of a 1.0 wt % $WCl_6$/toluene solution and 43 parts of the 2.5 wt % diisobutyl aluminum mono(n-hexoxide)/toluene solution prepared in Reference Example 1, and these were stirred for 15 minutes to thereby obtain a catalyst solution. Further, in a nitrogen atmosphere, a pressure resistant glass reaction vessel equipped with a stirrer was charged with 300 parts of cyclopentene and 1.24 parts of 1,4-bis(triethoxysilyl)-2-butene, to this, 130 parts of the catalyst solution prepared above was further added, and a polymerization reaction was performed at 25° C. for 4 hours. After 4 hours of the polymerization reaction, the pressure resistant glass reaction vessel was charged with an excess of ethyl alcohol to stop the polymerization, and then the solution in the pressure resistant glass reaction vessel was poured into a large excess of ethyl alcohol including 2,6-di-t-butyl-p-cresol (BHT). Next, the precipitated polymer was recovered, washed by ethyl alcohol, and then dried in vacuo at 40° C. for 3 days to thereby obtain 78 parts of an end modified cyclopentene ring-opening polymer (a1).

The obtained end modified cyclopentene ring-opening polymer (a1) was subjected to the respective measurements of the weight average molecular weight, the cis/trans ratio, the ratio of introduction of an oxysilyl group, and the glass transition temperature (Tg) according to the above methods. In the obtained end modified cyclopentene ring-opening polymer (a1), the weight average molecular weight was 366,000, the cis/trans ratio was 55/45, the ratio of introduction of an oxysilyl group was 143%, and the glass transition temperature (Tg) was −106° C.

Synthesis Example 2

In a nitrogen atmosphere, a glass vessel equipped with a stirrer was charged with 87 parts of a 1.0 wt % $WCl_6$/toluene solution and 43 parts of the 2.5 wt % diisobutyl aluminum mono(n-hexoxide)/toluene solution prepared in Reference Example 1, and these were stirred for 15 minutes to thereby obtain a catalyst solution. Further, in a nitrogen atmosphere, a pressure resistant glass reaction vessel equipped with a stirrer was charged with 300 parts of cyclopentene and 0.42 part of vinyl(triethoxy)silane, to this, 130 parts of the catalyst solution prepared above was further added, and a polymerization reaction was performed at 25° C. for 4 hours. After 4 hours of the polymerization reaction, the pressure resistant glass reaction vessel was charged with an excess of ethyl alcohol to stop the polymerization, and then the solution in the pressure resistant glass reaction vessel was poured into a large excess of ethyl alcohol including 2,6-di-t-butyl-p-cresol (BHT). Next, the precipitated polymer was recovered, washed by ethyl alcohol, and then dried in vacuo at 40° C. for 3 days to thereby obtain 76 parts of an end modified cyclopentene ring-opening polymer (a2).

The obtained end modified cyclopentene ring-opening polymer (a2) was subjected to the respective measurements of the weight average molecular weight, the cis/trans ratio, the ratio of introduction of an oxysilyl group, and the glass transition temperature (Tg) according to the above methods. In the obtained end modified cyclopentene ring-opening polymer (a2), the weight average molecular weight was 363,000, the cis/trans ratio was 52/48, the ratio of introduction of an oxysilyl group was 69%, and the glass transition temperature (Tg) was −106° C.

Synthesis Example 3

In a nitrogen atmosphere, a glass vessel equipped with a stirrer was charged with 87 parts of a 1.0 wt % $WCl_6$/toluene solution and 43 parts of the 2.5 wt % diisobutyl aluminum mono(n-hexoxide)/toluene solution prepared in Reference Example 1, and these were stirred for 15 minutes to thereby obtain a catalyst solution. Further, in a nitrogen atmosphere, a pressure resistant glass reaction vessel equipped with a stirrer was charged with 300 parts of cyclopentene, 200 parts of toluene and 0.12 part of 1-hexene, to this, 130 parts of the catalyst solution prepared above was further added, and a polymerization reaction was performed at 25° C. for 4 hours. After 4 hours of the polymerization reaction, the pressure resistant glass reaction vessel was charged with an excess of ethyl alcohol to stop the polymerization, and then the solution in the pressure resistant glass reaction vessel was poured into a large excess of ethyl alcohol including 2,6-di-t-butyl-p-cresol (BHT). Next, the precipitated polymer was recovered, washed by ethyl alcohol, and then dried in vacuo at 40° C. for 3 days to thereby obtain 81 parts of an unmodified cyclopentene ring-opening polymer (a3).

The obtained unmodified cyclopentene ring-opening polymer (a3) was subjected to the respective measurements of the weight average molecular weight, the cis/trans ratio, the ratio of introduction of an oxysilyl group, and the glass transition temperature (Tg) according to the above methods. In the obtained unmodified cyclopentene ring-opening polymer (a3), the weight average molecular weight was 389,000, the cis/trans ratio was 81/19, the ratio of introduction of an oxysilyl group was 0%, and the glass transition temperature (Tg) was −110° C.

Synthesis Example 4

In a nitrogen atmosphere, an autoclave equipped with a stirrer was charged with 4000 g of cyclohexane, 370 g of styrene, 205 g of 1,3-butadiene, 25 g of isoprene and 2.7 mmol of tetramethylethylenediamine, and thereafter n-butyllithium was added in an amount necessary for neutralization of polymerization inhibition impurities contained in the cyclohexane, styrene, 1,3-butadiene and isoprene. After that, 3.3 mmol of n-butyllithium was added for use in the polymerization reaction, and polymerization was initiated at 40° C. Next, after a lapse of 30 minutes from the initiation of polymerization, 50 g of styrene and 335 g of 1,3-butadiene were continuously added over 90 minutes. The maximum temperature in the polymerization reaction was 75° C. After such continuous addition, the polymerization reaction was further continued for 10 minutes, and the polymerization conversion rate was confirmed to be from 95% to 100% in range. After that, 15 g of isoprene was added to pertain the reaction for 10 minutes, and thereafter a small amount of a polymerization solution was sampled. Such a small amount of the polymerization solution sampled was subjected to termination of the reaction by addition of an excess of methanol, and thereafter air-dried to thereby obtain a polymer, and the polymer was used as a sample for gel permeation chromatographic analysis. The weight average molecular weight of the polymer sampled was 567,000.

Immediately after sampling of such a small amount of the polymerization solution, 0.083 mmol of 1,6-bis(trichlorosilyl)hexane as a coupling agent was added in the state of a 20 wt % solution in cyclohexane, to perform the reaction at 65° C. for 10 minutes. Next, 0.017 mmol of polyorganosiloxane represented by the following formula (9) as a modifying agent was added in the state of a 40 wt % solution in xylene, to perform the reaction at 65° C. for 20 minutes. After that, methanol was added as a polymerization terminator in an amount corresponding to 2 times by mole with respect to the amount of n-butyllithium used in the polymerization reaction, to obtain a solution containing an end modified solution polymerized styrene butadiene isoprene rubber (b1).

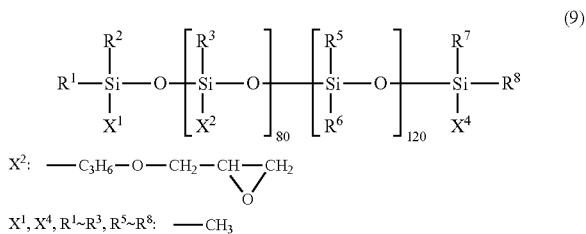

A part of the obtained solution containing the end modified solution polymerized styrene butadiene isoprene rubber (b1) was taken out, and, to this, 0.2 part of 2,4-bis(n-octylthiomethyl)-6-methylphenol with respect to 100 parts of the rubber component was added as an antioxidant. Next, the solvent was removed by steam stripping, and solid state rubber was recovered, dehydrated by a roll, and further dried by a hot air drier to thereby recover an end modified solution polymerized styrene butadiene isoprene rubber (b1). Further, the styrene monomer units content, the vinyl bond content of butadiene units portion, the weight average molecular weight and the glass transition temperature (Tg) of the obtained end modified solution polymerized styrene butadiene isoprene rubber (b1) were measured according to the above methods. In the obtained end modified solution polymerized styrene-butadiene rubber (b1), the styrene monomer units content was 42 wt %, the vinyl bond content of butadiene units portion was 30 wt %, the weight average molecular weight was 774,000 and the glass transition temperature (Tg) was −23° C.

Next, to the remaining solution containing the end modified solution polymerized styrene butadiene isoprene rubber (b1), 0.2 part of 2,4-bis(n-octylthiomethyl)-6-methylphenol as an antioxidant and 20 parts of Aromax T-DAE (made by JX Nippon Oil & Energy Corporation) as extension oil, with respect to 100 parts of the rubber component, were added. Next, the solvent was removed by steam stripping, and solid state rubber was recovered, dehydrated by a roll, and further dried by a hot air drier to thereby obtain an end modified solution polymerized styrene butadiene isoprene rubber (b1) which was oil-extended. The Mooney viscosity ($ML_{1+4}$, 100° C.) of the end modified solution polymerized styrene butadiene isoprene rubber (b1) which was oil-extended was 76.

Example 1

In a Brabender type mixer having a volume of 250 ml, 30 parts of the end modified cyclopentene ring-opening polymer (a1) obtained in Synthesis Example 1 and 84 parts of the end modified solution polymerized styrene butadiene isoprene rubber (b1) which was oil-extended (70 parts relative to the end modified solution polymerized styrene butadiene isoprene rubber (b1)) obtained in Synthesis Example 4 were masticated for 30 seconds, then 60 parts of silica (product name "Zeosil 1165MP", made by Solvay, nitrogen adsorption specific surface area (BET method): 163 m²/g), 26 parts of process oil (product name "Aromax T-DAE", made by JX Nippon Oil & Energy Corporation) and 6.4 parts of a silane coupling agent: 3-octanoylthio-1-propyltriethoxysilane (product name "NXT silane", made by Momentive Performance Materials Inc.) were added and kneaded at 110° C. as the starting temperature for 1.5 minutes, thereafter 20 parts of silica (product name "Zeosil 1165MP", made by Solvay), 10 parts of carbon black (product name "Seast 3", made by Tokai Carbon Co., Ltd.), 3 parts of zinc oxide, 2 parts of stearic acid and 2 parts of an antioxidant: N-phenyl-N'-(1,3-dimethylbutyl)-p-phenylenediamine (product name "Nocrac 6C", made by Ouchi Shinko Chemical Industrial Co., Ltd.) were added and further kneaded for 2.5 minutes, and then the kneaded material was discharged from the mixer. The temperature of the kneaded material at the time of the end of kneading was 150° C. The kneaded material was cooled down to room temperature, and then was again kneaded in a Brabender type mixer at 110° C. as the starting temperature for 3 minutes, and then the kneaded material was discharged from the mixer. Next, an open roll was used at 50° C. to knead the obtained kneaded material with 1.5 parts of sulfur and 4 parts of a cross-linking accelerator (mixture of 2 parts of cyclohexyl-2-benzothiazolylsulfenamide (made by Ouchi Shinko Chemical Industrial Co., Ltd., product name "Nocceler CZ-G") and 2 parts of diphenylguanidine (made by Ouchi Shinko Chemical Industrial Co., Ltd., product name "Nocceler D")), and then the sheet shaped rubber composition was obtained. Further, the obtained rubber composition was evaluated for abrasion resistance and low heat buildup property according to the above methods. The results are shown in Table 1.

Example 2

Except for changing the amount of the end modified cyclopentene ring-opening polymer (a1) obtained in Synthesis Example 1 from 30 parts to 50 parts, the amount of the end modified solution polymerized styrene butadiene isoprene rubber (b1) which was oil-extended, obtained in Synthesis Example 4, from 84 parts to 60 parts (50 parts relative to the end modified solution polymerized styrene butadiene isoprene rubber (b1)), and the amount of the process oil from 26 parts to 30 parts, respectively, the same method was followed as that in Example 1 to obtain a sheet shaped rubber composition. Further, the obtained rubber composition was evaluated for abrasion resistance and low heat buildup property according to the above methods. The results are shown in Table 1.

Example 3

Except for using 6.4 parts of a silane coupling agent represented by the following formula (10) (product name "NXTZ-45", made by Momentive Performance Materials Inc., in the following formula (10), x:y=55:45 (mol %)) as a silane coupling agent instead of 3-octanoylthio-1-propyltriethoxysilane, the same method was followed as that in Example 1 to obtain a sheet shaped rubber composition. Further, the obtained rubber composition was evaluated for abrasion resistance and low heat buildup property according to the above methods. The results are shown in Table 1.

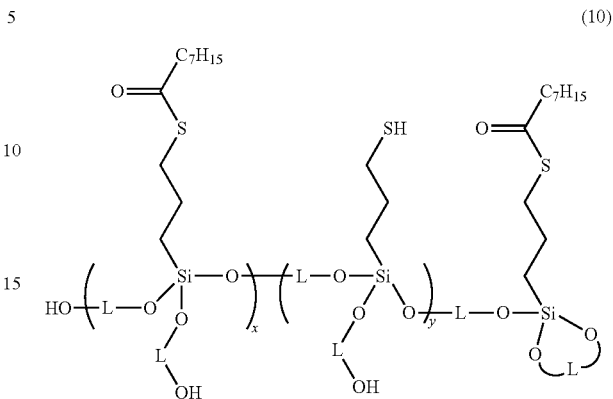

Example 4

Except for using 6.4 parts of a silane coupling agent represented by the following formula (11) (product name "VP-Si363", made by Evonik) as a silane coupling agent instead of 3-octanoylthio-1-propyltriethoxysilane, the same method was followed as that in Example 1 to obtain a sheet shaped rubber composition. Further, the obtained rubber composition was evaluated for abrasion resistance and low heat buildup property according to the above methods. The results are shown in Table 1.

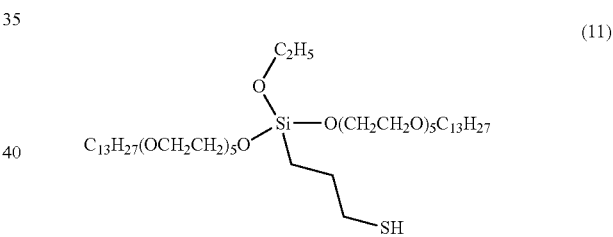

Example 5

Except for using silica (product name "Zeosil Premium 200MP", made by Rhodia, nitrogen adsorption specific surface area (BET method): 220 m²/g) instead of silica (product name "Zeosil 1165MP", made by Solvay) and changing the amount of the silane coupling agent: 3-octanoylthio-1-propyltriethoxysilane from 6.4 parts to 8 parts, the same method was followed as that in Example 1 to obtain a sheet shaped rubber composition. Further, the obtained rubber composition was evaluated for abrasion resistance and low heat buildup property according to the above methods. The results are shown in Table 1.

Example 6

Except for changing the amount of the silica from 80 parts to 45 parts, the amount of the carbon black from 10 parts to 45 parts, and the amount of the silane coupling agent: 3-octanoylthio-1-propyltriethoxysilane from 6.4 parts to 3.6 parts, the same method was followed as that in Example 1 to obtain a sheet shaped rubber composition. Further, the obtained rubber composition was evaluated for abrasion resistance and low heat buildup property according to the above methods. The results are shown in Table 1.

Example 7

Except for using the end modified cyclopentene ring-opening polymer (a2) obtained in Synthesis Example 2 instead of the end modified cyclopentene ring-opening polymer (a1) obtained in Synthesis Example 1, the same method was followed as that in Example 1 to obtain a sheet shaped rubber composition. Further, the obtained rubber composition was evaluated for abrasion resistance and low heat buildup property according to the above methods. The results are shown in Table 1.

Comparative Example 1

Except for using 70 parts of modified styrene-butadiene rubber (product name "Nipol NS612", made by Zeon Corporation, styrene monomer units content 15 wt %, vinyl bond content of butadiene units portion 30%, Mooney viscosity ($ML_{1+4}$, 100° C.) 62, glass transition temperature (Tg) −65° C., no extension oil contained) instead of 84 parts of the end modified solution polymerized styrene butadiene isoprene rubber (b1) which was oil-extended, obtained in Synthesis Example 4, and changing the amount of the process oil from 26 parts to 40 parts, the same method was followed as that in Example 1 to obtain a sheet shaped rubber composition. Further, the obtained rubber composition was evaluated for abrasion resistance and low heat buildup property according to the above methods. The results are shown in Table 1.

Comparative Example 2

Except for using 96 parts of unmodified styrene-butadiene rubber (product name "Nipol SBR1723", made by Zeon Corporation, styrene monomer units content 23.5 wt %, vinyl bond content of butadiene units portion 16%, Mooney viscosity ($ML_{1+4}$, 100° C.) 47, glass transition temperature (Tg) −50° C., containing 37.5 parts of extension oil with respect to 100 parts of a polymer foaming a rubber component) (60 parts relative to unmodified styrene-butadiene rubber) instead of 84 parts of the end modified solution polymerized styrene butadiene isoprene rubber (b1) which was oil-extended, obtained in Synthesis Example 4, and changing the amount of the process oil from 26 parts to 14 parts, the same method was followed as that in Example 1 to obtain a sheet shaped rubber composition. Further, the obtained rubber composition was evaluated for abrasion resistance and low heat buildup property according to the above methods. The results are shown in Table 1.

Comparative Example 3

Except for using the end modified cyclopentene ring-opening polymer (a3) obtained in Synthesis Example 3 instead of the end modified cyclopentene ring-opening polymer (a1) obtained in Synthesis Example 1, and 96 parts of unmodified styrene-butadiene rubber (product name "Nipol NS460", made by Zeon Corporation, styrene monomer units content 25 wt %, vinyl bond content of butadiene units portion 63%, glass transition temperature −25° C., Mooney viscosity ($ML_{1+4}$, 100° C.) 49, containing 37.5 parts of extension oil with respect to 100 parts of a polymer foaming a rubber component) (60 parts relative to unmodified styrene-butadiene rubber) instead of 84 parts of the end modified solution polymerized styrene butadiene isoprene rubber (b1) which was oil-extended, obtained in Synthesis Example 4, and changing the amount of the process oil from 26 parts to 14 parts, the same method was followed as that in Example 1 to obtain a sheet shaped rubber composition. Further, the obtained rubber composition was evaluated for abrasion resistance and low heat buildup property according to the above methods. The results are shown in Table 1.

Comparative Example 4

Except for changing the amount of the end modified cyclopentene ring-opening polymer (a1) obtained in Synthesis Example 1 from 30 parts to 10 parts, the amount of the end modified solution polymerized styrene butadiene isoprene rubber (b1) which was oil-extended, obtained in Synthesis Example 4 from 84 parts to 108 parts (90 parts relative to the end modified solution polymerized styrene butadiene isoprene rubber (b1)), and the amount of the process oil from 26 parts to 22 parts, respectively, the same method was followed as that in Example 1 to obtain a sheet shaped rubber composition. Further, the obtained rubber composition was evaluated for abrasion resistance and low heat buildup property according to the above methods. The results are shown in Table 1.

Comparative Example 5

Except for changing the amount of the end modified cyclopentene ring-opening polymer (a1) obtained in Synthesis Example 1 from 30 parts to 70 parts, the amount of the end modified solution polymerized styrene butadiene isoprene rubber (b1) which was oil-extended, obtained in Synthesis Example 4, from 84 parts to 36 parts (30 parts relative to the end modified solution polymerized styrene butadiene isoprene rubber (b1)), and the amount of the process oil from 26 parts to 34 parts, respectively, the same method was followed as that in Example 1 to obtain a sheet shaped rubber composition. Further, the obtained rubber composition was evaluated for abrasion resistance and low heat buildup property according to the above methods. The results are shown in Table 1.

Comparative Example 6

Except for changing the amount of the silica from 80 parts to 10 parts, the amount of the carbon black from 10 parts to 80 parts, and the amount of the silane coupling agent: 3-octanoylthio-1-propyltriethoxysilane from 6.4 parts to 1.6 parts, the same method was followed as that in Example 1 to obtain a sheet shaped rubber composition. Further, the obtained rubber composition was evaluated for abrasion resistance and low heat buildup property according to the above methods. The results are shown in Table 1.

Comparative Example 7

Except for using 6.4 parts of vinyltriethoxysilane (product name "KBE-1003", made by Shin-Etsu Chemical Co., Ltd.) as a silane coupling agent instead of 3-octanoylthio-1-propyltriethoxysilane, the same method was followed as that in Example 1 to obtain a sheet shaped rubber composition. Further, the obtained rubber composition was evaluated for abrasion resistance and low heat buildup property according to the above methods. The results are shown in Table 1.

TABLE 1

| | | Example | | | | | | | Comparative Example | | | | | | |
|---|---|---|---|---|---|---|---|---|---|---|---|---|---|---|---|
| | | 1 | 2 | 3 | 4 | 5 | 6 | 7 | 1 | 2 | 3 | 4 | 5 | 6 | 7 |
| Cyclopentene ring-opening polymer | | | | | | | | | | | | | | | |
| Cis/trans ratio | | 55/45 | 55/45 | 55/45 | 55/45 | 55/45 | 55/45 | 52/48 | 55/45 | 55/45 | 81/19 | 55/45 | 55/45 | 55/45 | 55/45 |
| End modification | | Modified | Modified | Modified | Modified | Modified | Modified | Modified | Modified | Modified | Unmodified | Modified | Modified | Modified | Modified |
| Glass transition temperature (° C.) | | −106 | −106 | −106 | −106 | −106 | −106 | −106 | −106 | −106 | −110 | −106 | −106 | −106 | −106 |
| Styrene butadiene isoprene rubber | | | | | | | | | | | | | | | |
| Styrene monomer units content (wt %) | | 42 | 42 | 42 | 42 | 42 | 42 | 42 | 15 | 23.5 | 25 | 42 | 42 | 42 | 42 |
| Vinyl bond content (wt %) | | 30 | 30 | 30 | 30 | 30 | 30 | 30 | 30 | 16 | 63 | 30 | 30 | 30 | 30 |
| End modification | | Modified | Modified | Modified | Modified | Modified | Modified | Modified | Modified | Unmodified | Unmodified | Modified | Modified | Modified | Modified |
| Glass transition temperature (° C.) | | −23 | −23 | −23 | −23 | −23 | −23 | −23 | −65 | −50 | −25 | −23 | −23 | −23 | −23 |
| Composition of rubber composition | | | | | | | | | | | | | | | |
| Cyclopentene ring-opening polymer | (parts) | 30 | 50 | 30 | 30 | 30 | 30 | 30 | 30 | 30 | 30 | 10 | 70 | 30 | 30 |
| Styrene butadiene isoprene rubber | (parts) | 70 | 50 | 70 | 70 | 70 | 70 | 70 | 70 | 70 | 70 | 90 | 30 | 70 | 70 |
| Silica (Zeosil 165MP) | (parts) | 80 | 80 | 80 | 80 | — | 45 | 80 | 80 | 80 | 80 | 80 | 80 | 10 | 80 |
| Silica (ZeosilPremium200 MP) | (parts) | — | — | — | — | 80 | — | — | — | — | — | — | — | — | — |
| Carbon black | (parts) | 10 | 10 | 10 | 10 | 10 | 45 | 10 | 10 | 10 | 10 | 10 | 10 | 80 | 10 |
| Monosulfide group-containing silane coupling agent (NXT silane) | (parts) | 6.4 | 6.4 | — | — | 8 | 3.6 | 6.4 | 6.4 | 6.4 | 6.4 | 6.4 | 6.4 | 1.6 | — |
| Monosulfide group-containing silane coupling agent (NXT-Z45) | (parts) | — | — | 6.4 | — | — | — | — | — | — | — | — | — | — | — |
| Thiol group-containing silane tagent (VP-Si363) | (parts) | — | — | — | 6.4 | — | — | — | — | — | — | — | — | — | — |
| Silane coupling agent containing no sulfur (KBE-1003) | (parts) | — | — | — | — | — | — | — | — | — | — | — | — | — | 6.4 |
| Process oil | (parts) | 26 | 30 | 26 | 26 | 26 | 26 | 26 | 40 | 14 | 14 | 22 | 34 | 26 | 26 |
| Zinc oxide | (parts) | 3 | 3 | 3 | 3 | 3 | 3 | 3 | 3 | 3 | 3 | 3 | 3 | 3 | 3 |
| Stearic acid | (parts) | 2 | 2 | 2 | 2 | 2 | 2 | 2 | 2 | 2 | 2 | 2 | 2 | 2 | 2 |
| Antioxidant | (parts) | 2 | 2 | 2 | 2 | 2 | 2 | 2 | 2 | 2 | 2 | 2 | 2 | 2 | 2 |
| Cross-linking accelerator | (parts) | 4 | 4 | 4 | 4 | 4 | 4 | 4 | 4 | 4 | 4 | 4 | 4 | 4 | 4 |
| Cross-linking agent | (parts) | 1.5 | 1.5 | 1.5 | 1.5 | 1.5 | 1.5 | 1.5 | 1.5 | 1.5 | 1.5 | 1.5 | 1.5 | 1.5 | 1.5 |
| Evaluation | | | | | | | | | | | | | | | |
| Abrasion resistance | | 110 | 105 | 112 | 105 | 114 | 107 | 105 | 100 | 100 | 95 | 99 | 90 | 100 | 98 |
| Low heat buildup property | | 119 | 121 | 124 | 133 | 114 | 107 | 110 | 100 | 84 | 93 | 100 | 119 | 91 | 90 |

As shown in Table 1, each rubber composition for a tire obtained by compounding predetermined amounts of silica and a silane coupling agent including a monosulfide group and/or a thiol group to a rubber component including 15 to 55 wt % of an end modified group-containing cycloolefin ring-opening polymer having a glass transition temperature of −120 to −90° C. and 45 to 85 wt % of an end modified group-containing solution polymerized conjugated diene polymer obtained by solution polymerization, having a glass transition temperature of −60 to −10° C. and having an aromatic vinyl monomer units content ratio of more than 30 wt % and 50 wt % or less, gave a cross-linked rubber excellent in abrasion resistance (in particular, abrasion resistance in a region where a slip ratio is low) and low heat buildup property (Examples 1 to 7).

On the other hand, a cross-linked rubber obtained by using each of a rubber composition containing a styrene-butadiene rubber having a lower styrene monomer units content and a lower glass transition temperature than the predetermined ranges in the present invention, a rubber composition containing an unmodified cyclopentene ring-opening polymer, a rubber composition containing a modified cyclopentene ring-opening polymer in an amount not falling within the predetermined range in the present invention, and a rubber composition containing a silane coupling agent having no monosulfide group and/or no thiol group, was inferior in a balance between abrasion resistance and low heat buildup property (Comparative Examples 1 to 7).

The invention claimed is:

1. A rubber composition for a tire, comprising:
   a rubber component including: (i) 25 to 55 wt % of an end modified group-containing cycloolefin ring-opening polymer having a glass transition temperature of −120 to −90° C. and (ii) 45 to 75 wt % of an end modified group-containing solution polymerized conjugated diene polymer having a glass transition temperature of −60 to −10° C. and having an aromatic vinyl monomer units content ratio of more than 30 wt % and 50 wt % or less,
   a silica, and
   a silane coupling agent including a monosulfide group and/or a thiol group, wherein
   a content of the silica with respect to 100 parts by weight of the rubber component is 30 to 200 parts by weight, and a content of the silane coupling agent including a monosulfide group and/or a thiol group with respect to 100 parts by weight of the silica is 0.3 to 20 parts by weight.

2. The rubber composition for a tire according to claim 1, wherein the end modified group-containing cycloolefin ring-opening polymer is a polymer in which an oxysilyl group is introduced to an end of a polymer chain.

3. The rubber composition for a tire according to claim 1, wherein the end modified group-containing solution polymerized conjugated diene polymer has a group introduced by a reaction of at least one of the compounds represented by the following general formulas (1) to (3) with a solution polymerized conjugated diene polymer chain having an active end:

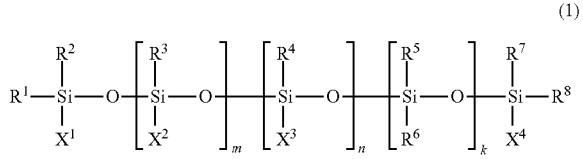

(1)

where, in the above general formula (1), each of $R^1$ to $R^8$ represents an alkyl group having 1 to 6 carbon atoms or an aryl group having 6 to 12 carbon atoms, and $R^1$ to $R^8$ may be the same as or different from each other; each of $X^1$ and $X^4$ represents a functional group able to react with the active end of the polymer chain, an alkyl group having 1 to 6 carbon atoms, or an aryl group having 6 to 12 carbon atoms, and $X^1$ and $X^4$ may be the same as or different from each other; $X^2$ represents a functional group able to react with the active end of the polymer chain; $X^3$ represents a group containing 2 to 20 alkyleneglycol repeating units;
and "m" is an integer of 3 to 200, "n" is an integer of 0 to 200, and "k" is an integer of 0 to 200;

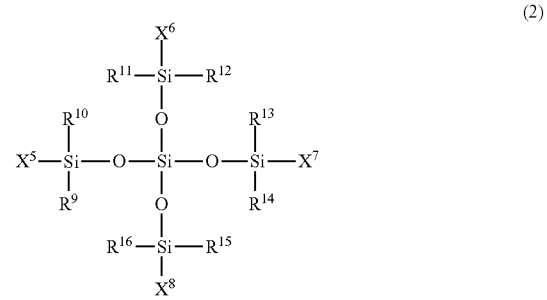

(2)

where, in the above general formula (2), each of $R^9$ to $R^{16}$ represents an alkyl group having 1 to 6 carbon atoms or an aryl group having 6 to 12 carbon atoms, and $R^9$ to $R^{16}$ may be the same as or different from each other; and each of $X^5$ to $X^8$ represents a functional group able to react with the active end of the polymer chain;

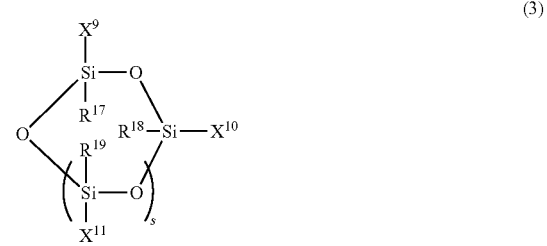

(3)

where, in the above general formula (3), each of $R^{17}$ to $R^{19}$ represents an alkyl group having 1 to 6 carbon atoms or an aryl group having 6 to 12 carbon atoms, and $R^{17}$ to $R^{19}$ may be the same as or different from each other; each of $X^9$ to $X^{11}$ represents a functional group able to react with the active end of the polymer chain; and "s" is an integer of 1 to 18.

4. The rubber composition for a tire according to claim 1, wherein the end modified group-containing solution polymerized conjugated diene polymer contains 1,3-butadiene units and isoprene units as conjugated diene monomer units.

5. The rubber composition for a tire according to claim 1, wherein a nitrogen adsorption specific surface area of the silica is 50 to 300 $m^2/g$.

6. The rubber composition for a tire according to claim 1, further comprising 1 to 150 parts by weight of carbon black with respect to 100 parts by weight of the rubber component.

7. A cross-linked rubber obtained by cross-linking the rubber composition for a tire according to claim 1.

8. A tire comprising the cross-linked rubber according to claim 7.

9. The rubber composition for a tire according to claim 1, wherein the end modified group-containing cycloolefin ring-opening polymer has modified groups at both polymer chain ends.

\* \* \* \* \*